United States Patent [19]

Seleman et al.

[11] Patent Number: 4,812,235

[45] Date of Patent: Mar. 14, 1989

[54] FILTER ELEMENT ASSEMBLY REPLACEABLE MESH PACK

[75] Inventors: Don J. Seleman, Granada Hills; Roy F. Honzik, Sepulveda, both of Calif.

[73] Assignee: HR Textron, Inc., Valencia, Calif.

[21] Appl. No.: 539,221

[22] Filed: Sep. 26, 1983

Related U.S. Application Data

[63] Continuation of Ser. No. 362,804, Mar. 29, 1982, abandoned.

[51] Int. Cl.[4] ............................................. B01D 29/26
[52] U.S. Cl. ..................................... 210/247; 210/346; 210/361; 210/484; 210/485; 210/487; 210/488; 210/497.01
[58] Field of Search ............... 210/247, 346, 347, 461, 210/484, 485, 486, 487, 488, 497.01

[56] References Cited

U.S. PATENT DOCUMENTS

| | | | |
|---|---|---|---|
| 323,637 | 8/1885 | Connolly | 210/484 X |
| 364,599 | 6/1887 | Morris | 210/461 |
| 2,448,157 | 8/1948 | Schneider | 210/487 |
| 4,196,027 | 4/1980 | Walker et al. | 210/508 X |

FOREIGN PATENT DOCUMENTS 1247900 10/1960 France ............................ 210/487

*Primary Examiner*—Richard V. Fisher
*Attorney, Agent, or Firm*—Nilsson, Robbins, Dalgarn, Berliner, Carson & Wurst

[57] ABSTRACT

A filter element constructed of stainless steel. The element includes a pair of filter media concentrically disposed to receive parallel flow of the filtrant. The element is adapted for disassembly to remove the filter media. The various component parts of the filter element may thereafter be easily cleaned and the filter media replaced. The filter media after being removed may also be cleaned and reused if desired. The component parts include appropriate guard assemblies to protect the filter media during handling and use.

9 Claims, 2 Drawing Sheets

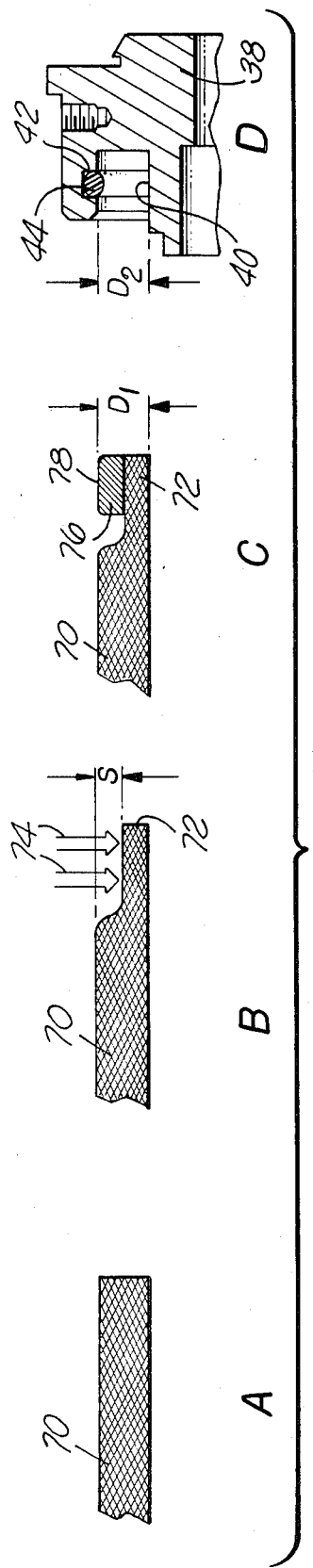
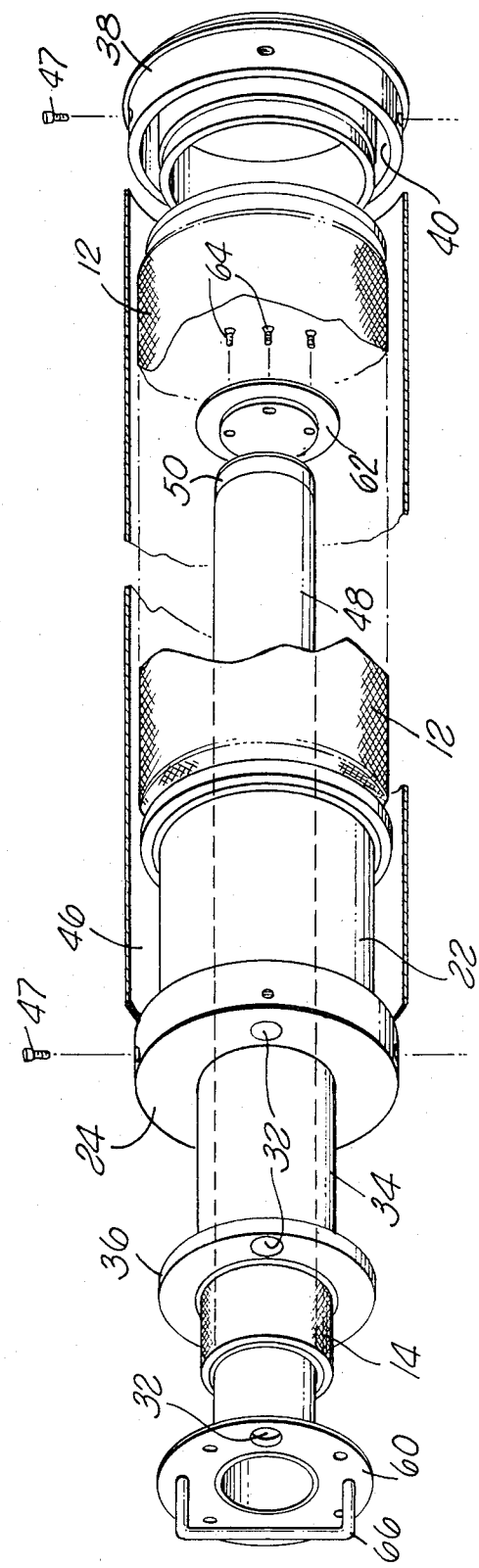

FILTER ELEMENT ASSEMBLY REPLACEABLE MESH PACK

RELATED APPLICATION

This application is a continuation of U.S. application Ser. No. 06/362,804 filed Mar. 29, 1982, now abandoned.

BACKGROUND OF THE INVENTION

The present invention is directed toward the large area metallic filter elements which are used to filter high viscosity materials (approximately 200 to 20,000 poise) at relatively high temperatures (in excess of approximately 100° C.) at relatively high pressures (in excess of approximately 400 p.s.i. guage differential). Prior art filters of this type traditionally include concentrically arranged dual filter media permanently affixed to appropriate support and mounting components to form the complete filter element to receive the filtrant through parallel flow paths for removing contaminants therefrom. The entire element is appropriately received within a housing or chamber through which the filtrant passes while being filtered.

In the prior art relating to such filter elements it has been customary to remove the filter element from the housing when it is no longer capable of accomplishing the desired cleansing of the filtrant and then cleaning the filter element for further use. It has been found that the life of the filter element is limited by the number of cleaning cycles the filter media is capable of withstanding. When the prior art filter media becomes no longer useful, that is, it can no longer be cleaned sufficiently to allow it to efficiently remove contaminants from the filtrant, the entire filter element is discarded. Although the filter media is no longer capable of continued efficient use the remaining components of the filter element could have additional life but for the inoperable filter media.

Prior art U.S. Pat. No. 4,218,324 issued Aug. 19, 1980 to W. U. Hartmann et al discloses a stainless steel metallic filter element of relatively small diameter constructed in such a manner that the filter media member may be removed and cleaned and replaced for further use by slipping the filter media over the outer surface of an appropriate support member. While the structure disclosed in U.S. Pat. No. 4,218,324 operates excellently for the small size filter elements, it has been found that it is inappropriate to the large area dual filter media filter elements of the present invention.

The U.S. Pat. No. 2,448,157 to Schneider discloses a dual filter media portable filter in which the filter media is a spun glass woven knitted or otherwise fabricated mesh stretched over a pair of cylindrical perforate shells for filtering liquid contained within an open tank such as an electroplating bath. The spun glass fabric may be removed from the shells for washing or replacement. The filter element as disclosed in the Schneider U.S. Pat. No. 2,448,157 is not usable with the filtrant employed with the filter elements constructed in accordance with the present invention.

Additional prior art patents known to applicants are: U.S. Pat. Nos. 1,918,980, 3,312,349, 3,653,512, 3,750,889, 3,883,430, 3,900,401, 4,167,483 and 4,179,372.

SUMMARY OF THE INVENTION

A metallic filter element for fine filtration under somewhat adverse operating conditions. The filter element may be easily disassembled for cleaning and replacement of the filter media as well as all of the component parts of the filter element. The filter element includes a pair of metal filter media concentrically disposed over a pair of support tubes with guard shield means protecting the filter media and retaining means removably securing the media on the support tubes.

BRIEF DESCRIPTION OF THE DRAWINGS

FIG. 2 is a series of FIGURES illustrating construction of the ends of the filter media; and FIG. 3 is a partially exploded view of the filter element of the present invention illustrative of the disassembly or assembly thereof.

DETAILED DESCRIPTION OF THE INVENTION

Figure 1:
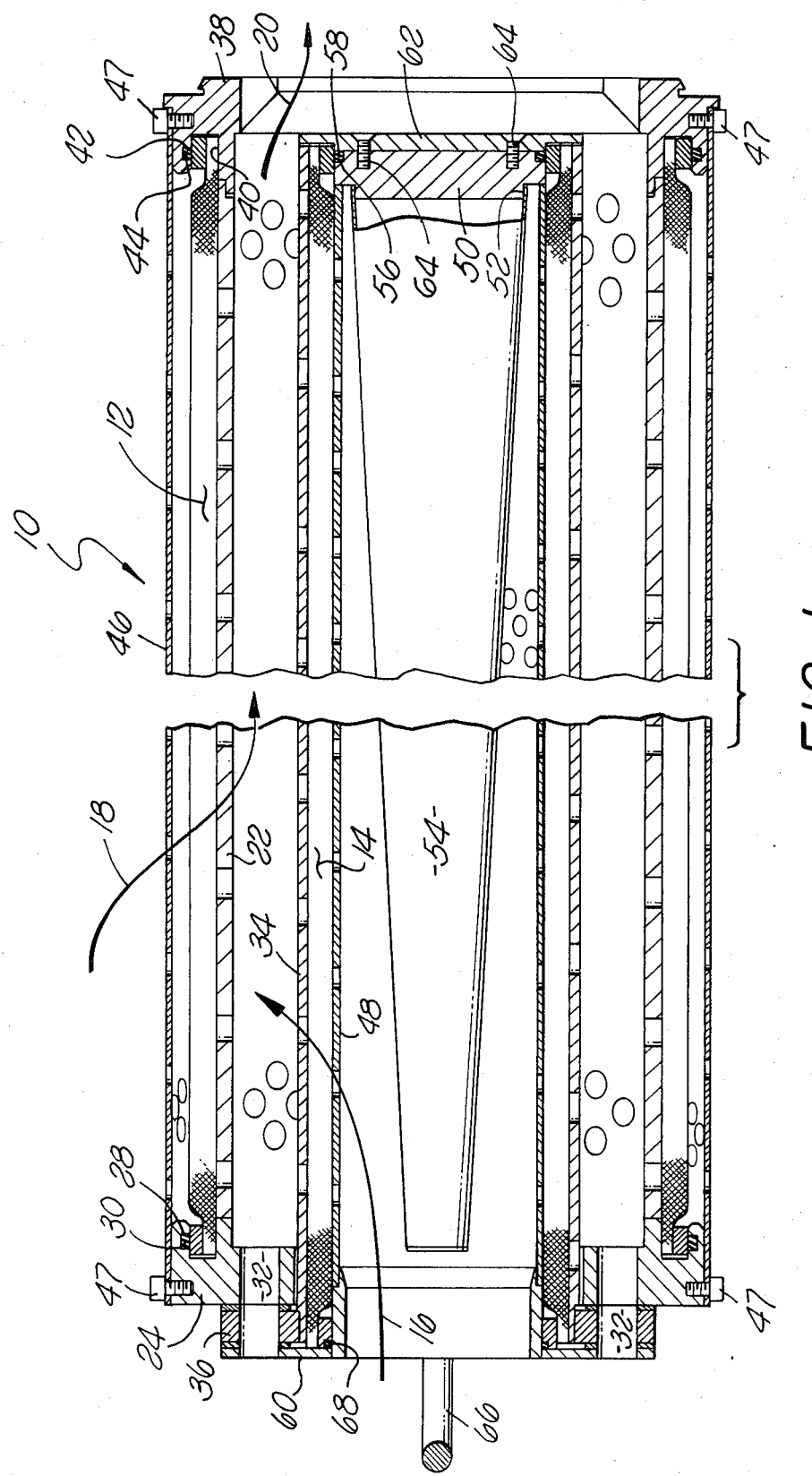
FIG. 1 is a cross sectional view of a filter element constructed in accordance with the present invention.

Referring now to the drawings and more particularly to FIG. 1 there is illustrated a filter element 10 constructed in accordance with the present invention. The filter element 10 includes an outer filter media 12 and an inner filter media 14 appropriately retained within a supporting framework to receive a fluid filtrant in parallel flow paths through the media 12 and 14 as shown by the arrows 16 and 18 to be filtered and then to pass from the element as shown by the arrow 20. The filter element, including the media 12 and 14, is constructed of corrosion resistant material such as stainless steel so as to withstand temperatures in excess of approximately 100° C. and pressures in excess of approximately 400 p.s.i.g. differential and the framework which receives the media 12 and 14 is constructed so as to withstand the pressure drops experienced with high viscosity material (approximately 200 to 20,000 poise).

The outer filter media 12 rests upon a tubular outer perforate support tube 22. The support tube 22 has a fitting 24 permanently affixed thereto as by welding. The fitting 24 is annular in configuration and defines an annular slot 26 which receives one end of the outer filter media 12. The annular slot defines a recess or groove 28 within which there is disposed an O-ring 30 to seal the end of the filter media to prevent leakage of the filtrant therearound. The fitting 24 defines an opening 32 therethrough for a purpose to be described below.

The inner filter media 14 rests upon an inner perforate metal support tube 34. The support tube 34 includes a flange 36 extending radially outwardly therefrom and permanently secured thereto as by welding. The flange 36 also defines an opening (unnumbered) which mates with the opening 32 in the fitting 24.

It will now be noted that the outer and inner support tubes 22 and 34, respectively, provide support for the outer and inner filter media 12 and 14, respectively, to prevent collapse thereof as the fluid filtrant flows in the direction as indicated by the arrows 16 and 18.

The opposite end of the filter media 12 is supported by an outer retaining ring 38 which defines an annular slot 40 therein for receiving the opposite end of the filter media 12. The slot 40 defines a recess 42 within which there is seated a sealing O-ring 44 which cooperate with the end of the filter media 12 to prevent filtrant leakage therearound.

An outer shield or guard means 46 is supported upon the fitting 24 and the retainer 38 and is held in place by appropriate fasteners such as the cap screws 47. The outer guard 46 functions to prevent collapse of the filter media 12 in the vent of back flushing of the filter element. In addition thereto, the guard 46 protects the filter media 12 from damage by foreign objects during handling thereof. It should be noted that the guard 46 is perforate to provide ample flow paths for the fluid filtrant as indicated by the arrow 18.

From FIG. 1 it can be seen that the fitting 24 and the retaining ring 38 define opposed slots 26 and 40 for receiving each of the two ends of the outer filter media 12. These opposed slots in conjunction with the support tube 22 and outer guard 46 form retaining means for the outer filter media 12.

An inner guard or shield 48 is provided and is positioned adjacent the inner surface of the inner filter media 14. The inner guard functions precisely the same as does the outer guard but with respect to the inner filter media 14. In addition, the inner guard 48 is closed at one end by a plug 50 which defines a shoulder 52 to which there is permanently affixed a cone 54 to control flow of filtrant and to avoid dead spaces within the center of the element. The plug 50 defines a groove 56 within there is positioned a sealing O-ring 58 which cooperates with one end of the inner media 14 to prevent filtrant leakage therearound. Space is provided between the circumference of the plug 50 and the inner support tube 34 to receive one end of the filter media 14. The opposite end of the filter media 14 is received in a space provided between the outer surface of the inner guard 48 and the inner surface of the inner support tube 34.

The guard 48 has flange 60 permanently affixed thereto as by welding and which extends radially outwardly therefrom. The flange 60 also defines an opening which mates with the opening 32 in the fitting 24. As can be seen a pair of sealing gaskets 61 and 63 are received between the flanges 36 and 60 and the flange 36 and the fitting 24, respectively.

A cap 62 is secured to the plug 50 by appropriate fasteners such as the screws 64 while the flange 60 is secured to the flange 36 by similar appropriate fasteners (not shown). A handle 66 is secured to the flange 60 so that the entire filter element may be removed from the filter housing as a unit for cleaning and replacement.

As can be seen the combination of the cap 62, plug 50 and the end of the inner support tube 34 defines a slot 65 for receiving one end of the inner filter media 14 to retain it in place. The opposite end of the filter media 14 is retained within a slot 67 defined by the flange 60 and the opposed surfaces of the inner support tube and guard shield. The slots 65 and 67 are opposed.

The ends of the filter media are fabricated to effect seals thereby preventing leakage of the fluid filtrant around the ends of the filter media thereby forcing all of the fluid to pass through the filter media before leaving the filter element. By reference to FIG. 2 the manner of fabrication is shown. As is illustrated in FIG. 2A, an appropriate filter media is segmentally shown. The filter media member includes a tubular pleated filter media 70 constructed of a plurality of randomly disposed metallic fibers which have been sintered. Such a filter media is well known in the art and may be constructed in accordance with the teachings of U.S. Pat. No. 3,504,422 which is incorporated herein by reference. By way of summary only, the disclosure of said patent generally teaches that metallic fibers having a cross sectional area to provide the desired absolute filter rating for the filter media 70 are formed into an air-laid web and thereafter are processed by compression and sintering to form a felted cloth material. This material may then be placed between woven wire meshes to provide additional support and the combination thereafter pleated and formed into a circular tubular configuration as shown and described in conjunction with FIG. 1.

As is shown in FIG. 2B the end 72 of the media 70 is compressed by applying pressure thereto as shown by the arrows 74. The end 72 is compressed so as to substantially be solid after the compression as compared to the porous filter media 70 prior thereto. As shown in FIG. 2C, the space S formed by the compression is radially completely and longitudinally at least partially filled by a solid metal annulus 76 permanently secured to the end 72 of the filter media 70, for example, as by welding. The solid metal annulus 76 may then have its outer surface 78 machined or otherwise finished so that an appropriate dimension $D_1$ is provided for the end of the filter media including the annulus 76 and the compressed portion 72. The dimension $D_1$ is determined by the dimension within which the end of the filter will be received such, for example, as is shown in FIG. 2D which is a fragmented section of the outer retaining ring 38. As is therein shown the annular slot 40 defines an opening having the dimension $D_2$. The dimension $D_1$ is substantially equal to the dimension $D_2$. Thus when the end of the filter media is inserted into the annular slot 40, a compression of the O-ring 44 occurs to a degree such that a seal is effected.

Similar dimensional consideration is provided for the other ends of the filter media so that the appropriate seals are obtained when the ends of the media are inserted into the designated slots 26 and 40 receptacles. As is shown with regard to FIG. 1, the O-ring 58 will be compressed by the end of the filter media 14 while an additional O-ring 68 is provided at the opposite end for effecting a seal thereat.

Those skilled in the prior art wil recognize that when the temperature of the filtrant exceeds approximately 150° C. the traditional O-rings and gaskets are no longer useful. Under these circumstances the seals may be accomplished by using metal-to-metal contacts such as shown in the Hartmann et al U.S. Pat. No. 4,218,324 above referenced which is incorporated herein by this reference.

By reference to FIG. 3 it can now be seen that the filter element of the present invention can be readily disassembled after it has been removed from its housing. The filter element is retained within a housing (not shown) by a pair of rods (not shown) which are secured at one end of the housing and extend through the filter element and through the openings 32—32' where a pair of cap nuts secure the filter element sealably within the housing so the fluid being filtered may pass through the filter media as indicated by the arrows 16 and 18 and out as indicated by the arrow 20. By removal of the cap screws (not shown), the filter element may be removed from the housing by utilization of the handle 66.

After removal of the filter element from the housing (not shown) a new filter element may be immediately inserted in place, secured by the cap screws, the housing closed and the process flow continued to thereby have a minimum of down time for the system while the filter is being cleaned and replaced.

The removed contaminated filter element may be cleaned after being disassembled in a relatively easy and simple matter. The cap screws 47 can be removed after which the outer guard 46 is removed by sliding the same toward the left as viewed in FIG. 1. Thereafter the outer retainer ring 38 is removed after which the outer filter media 12 can be removed by sliding it toward the right as viewed in FIG. 1 along the support tube 22.

Thereafter the end cap 62 is removed by first removing the retaining screws 64. The additional screws are also removed from the flange 60 after which the inner guard 48 can be removed by sliding it toward the left as viewed in FIG. 1. Thereafter the inner support tube 34 may be removed from the inner filter media 14.

With the components thus disassembled each may be separately cleaned without interference from the other components. After appropriate cleaning to remove all foreign matter therefrom the entire element may be reassembled by reversing the disassembly procedure above briefly described. Obviously those skilled in the art will recognize that all appropriate O-rings and gaskets are replaced upon each reassembly of the filter element.

Those skilled in the art will recognize that a large area filter element having replaceable dual filter media as well as replaceable components contained therein has been disclosed and will provide extended life for filter elements since the framework supporting the filter media may be used indefinitely with only the filter media being replaced after the same have become no longer usable. In addition thereto those skilled in the art will recognize that the framework may be used to support different types of filter media having different absolute filter ratings without the necessity of generating or providing separate framework for each absolute filter rating filter media.

What is claimed is:

1. A dual metallic filter element for filtering materials having a viscosity in excess of about 200 poise at temperatures in excess of about 100° C. and pressures in excess of approximately 400 p.s.i. and having dual replaceable spaced apart filter media, said material being filtered by flowing through each of said media from one side thereof, the upstream side, to another side thereof, the downstream side, comprising:

(A) outer stainless steel metal filter media perforate support tube means;
   (B) outer stainless steel metal filter media perforate tubular guard shield means;
   (C) first tubular stainless steel metal filter media disposed between said outer tube and shield means;
   (D) inner stainless steel metal filter media perforate support tube means;
   (E) inner stainless steel metal filter media perforate tubular guard shield means;
   (F) second tubular stainless steel metal filter media disposed between said inner tube and shield means;
   (G) said first filter media being concentrically disposed outwardly relative said second filter media and defining an inner tubular volume surrounded by an annular outer void volume, said volumes having adjacent first ends and adjacent seconds end; and
   (H) retaining means including cap means and fitting means removably securing each said filter media on its respective support tube means and plugging said first end of said tubular volume and said second end of said annular void volume respectively, said support tube means being disposed opposed each other, defining said annular outer void volume, and being on the downstream side of the flow of said material through each said filter media.

2. A filter element as defined in claim 1 wherein each end of each of said tubular filter media is substantially solid.

3. A filter element as defined in claim 2 wherein said solid ends of said media include a solid metal annulus permanently affixed to each end of said media, each said solid end having a predetermined cross sectional width $D_1$.

4. A filter media as defined in claim 3 wherein said filter media is inwardly compressed at its outer ends to be substantially solid and define a void, and said solid metal annulus fills at least part of the void left by said compression.

5. A filter media as defined in claim 4 which further includes compressible seal means disposed in said retaining means, said solid metal annulus coacting with said seal means to effect seals at each end of said media.

6. A filter element as defined in claim 5 wherein said retaining means includes means defining opposed annular slots for receiving each end of said filter media with said attached solid metal annulus.

7. A filter element as defined in claim 6 wherein said opposed slots for said first filter media are defined by a fitting permanently secured to said outer support tube at one end of said outer support tube and a retainer ring disposed at another end of said outer support tube.

8. A filter element as defined in claim 7 wherein said opposed slots for said second filter media are defined by opposite opposed ends of said inner support tube and inner guard shield; and which further includes a flange at one end permanently secured to said inner guard shield and a cap disposed at another end of said inner guard shield, each of said slots having a predetermined cross sectional width $D_2$, $D_1$ being substantially equal to $D_2$.

9. A filter element as defined in claim 8 wherein said retainer ring and said cap are held in place by removable fasteners.

* * * * *